(12) United States Patent
Iikawa

(10) Patent No.: US 7,756,405 B2
(45) Date of Patent: Jul. 13, 2010

(54) INTERCHANGEABLE LENS, AND A CAMERA SYSTEM INCLUDING AN INTERCHANGEABLE LENS

(75) Inventor: Makoto Iikawa, Saitama (JP)

(73) Assignee: Hoya Corporation, Tokyo (JP)

( * ) Notice: Subject to any disclaimer, the term of this patent is extended or adjusted under 35 U.S.C. 154(b) by 269 days.

(21) Appl. No.: 11/860,659

(22) Filed: Sep. 25, 2007

(65) Prior Publication Data

US 2008/0075454 A1   Mar. 27, 2008

(30) Foreign Application Priority Data

Sep. 25, 2006   (JP) .............................. 2006-259410

(51) Int. Cl.
  *G03B 17/08* (2006.01)
  *G03B 17/00* (2006.01)
(52) U.S. Cl. ........................................ 396/25; 396/529
(58) Field of Classification Search .................. 396/25, 396/29, 513, 529–533
  See application file for complete search history.

(56) References Cited

U.S. PATENT DOCUMENTS

| | | | | |
|---|---|---|---|---|
| 2,842,030 A | * | 7/1958 | Geddes | ........................ 359/827 |
| 4,168,897 A | * | 9/1979 | Gates | ........................... 396/25 |
| 4,963,902 A | * | 10/1990 | Fukahori | ...................... 396/29 |
| 5,177,515 A | * | 1/1993 | Tsukamoto | ................... 396/27 |
| 5,701,518 A | * | 12/1997 | Honda et al. | ................... 396/29 |
| 6,747,807 B2 | | 6/2004 | Iikawa et al. | |
| 6,829,103 B2 | | 12/2004 | Kobayashi et al. | |

FOREIGN PATENT DOCUMENTS

JP    11-174562    7/1999

OTHER PUBLICATIONS

English language Abstract of JP 11-174562.

* cited by examiner

*Primary Examiner*—Christopher E Mahoney
*Assistant Examiner*—Leon W Rhodes
(74) *Attorney, Agent, or Firm*—Greenblum & Bernstein P.L.C.

(57) ABSTRACT

An interchangeable lens selectively mountable to a first-type camera body and a second-type camera body, the first-type camera body including a first mount ring to which the interchangeable lens is mountable, the second-type camera body including a second mount ring to which the interchangeable lens is mountable, an outer diameter of the second mount ring being smaller than an outer diameter of the first mount ring. The interchangeable lens includes an annular packing made of a resilient material. An inner peripheral surface of the annular packing is positioned radially outside the second mount ring when the interchangeable lens is mounted to the second-type camera body. The inner peripheral surface of the annular packing is positioned radially inside an outer peripheral surface of the first mount ring when the interchangeable lens is mounted to the first-type camera body.

6 Claims, 7 Drawing Sheets

Front ←——→ Rear

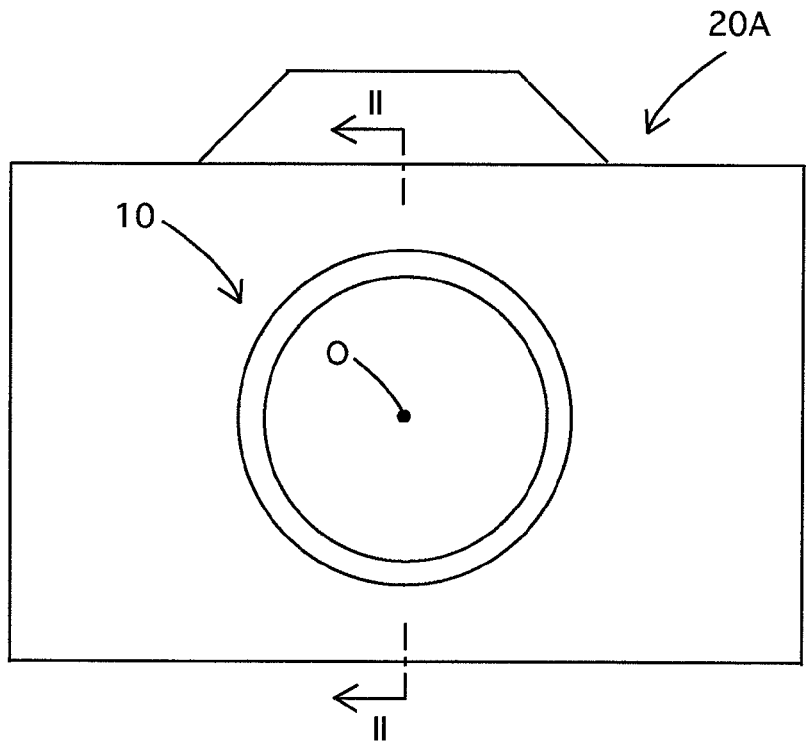
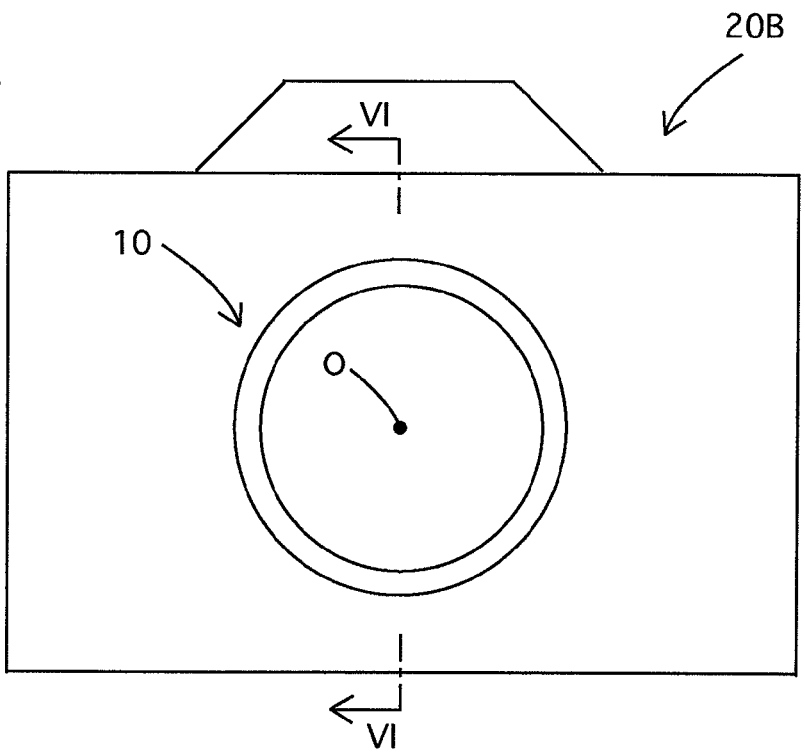

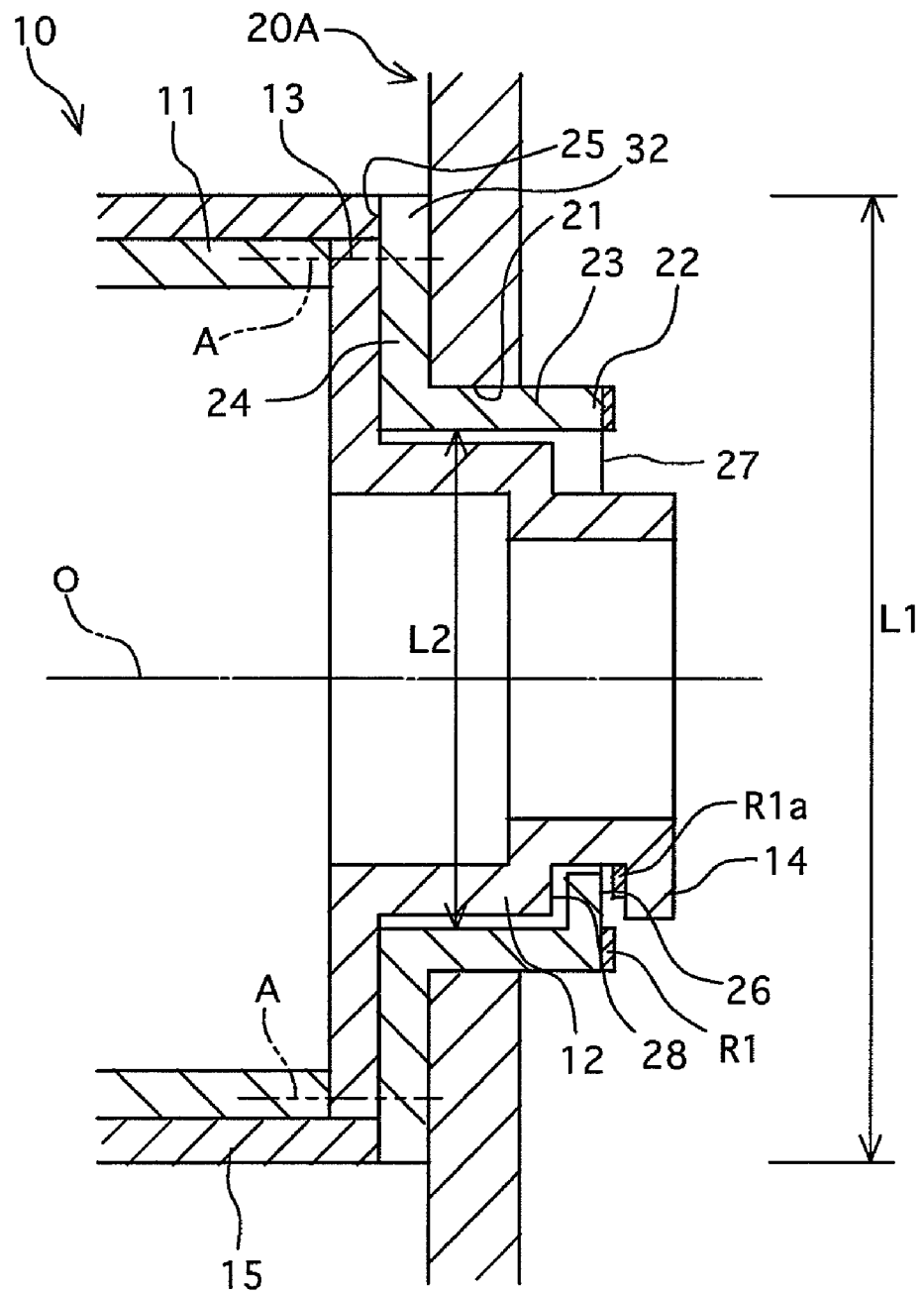

Front ⟵⟶ Rear

Front ⟵⟶ Rear

Front ←——→ Rear

PRIOR ART

Front ←——→ Rear

PRIOR ART

INTERCHANGEABLE LENS, AND A CAMERA SYSTEM INCLUDING AN INTERCHANGEABLE LENS

BACKGROUND OF THE INVENTION

1. Field of the Invention

The present invention relates to an interchangeable lens which is selectively mountable to a packing-compatible camera body and a packing-incompatible camera body, and also relates to a camera system which includes a packing-compatible camera body, this packing-incompatible camera body and a interchangeable lens.

2. Description of the Related Art

Conventionally, in order to provide a water-resistant camera system which is composed of at least one interchangeable lens and a camera body, the interchangeable lens is provided at the rear end thereof with an annular packing made of a resilient material. This annular packing comes into elastic contact with a body-side mount (body mount) of a camera body when the interchangeable lens is mounted to the camera body.

Camera manufacturers manufacture their own-brand camera bodies so that all these camera bodies have body-side mounts of the same shape and size to make all their own-brand interchangeable lenses compatible with all their own-brand camera bodies (note that the shape and size of the body-side mount differ according to camera manufacturers).

However, since camera manufactures unify the shapes of the body-side mounts of their own-brand camera bodies as just described, the user who has bought a packing-incorporated interchangeable lens is inconvenienced, which will be hereinafter discussed with reference to FIGS. 8 and 9.

FIG. 8 shows a state where an interchangeable lens 010 provided with an annular packing 015 made of a resilient material is mounted to a camera body 020A and are both produced by the same camera manufacturer, and FIG. 9 shows a state where the same interchangeable lens 010 is mounted to another type of camera body 020B produced by the same camera manufacturer.

The interchangeable lens 010 shown in FIG. 8 and the interchangeable lens 010 shown in FIG. 9 are the same. The interchangeable lens 010 is provided at the rear end thereof with a lens-side mount ring (lens mount) 012, and the annular packing 015 is fixed to an outer peripheral surface of the lens-side mount ring 012. The rear end of the annular packing 015 in a free state projects rearward from front outer flange of the lens-side mount ring 012.

The camera body 020A, a part of which is shown in FIG. 8, is designed as a packing-compatible camera body which is compatible with the interchangeable lens 010. Upon the lens-side mount ring 012 of the interchangeable lens 010 being coupled to a body-side mount ring (body-side mount) 022 of the packing-compatible camera body 020A, the rear end of the annular packing 015 comes into elastic contact with the front surface (packing contacting surface) of an outward flange portion 024 of the body-side mount ring 022 (which is formed at the front end thereof) while being resiliently deformed. Therefore, in the case shown in FIG. 8, the joint between the interchangeable lens 010 and the packing-compatible camera body 020A is made watertight by the annular packing 015.

The camera body 020B, a part of which is shown in FIG. 9, is designed as a packing-incompatible camera body. Although the packing-incompatible camera body 020B is designed without consideration of connectability (compatibility) with the interchangeable lens 010, it is possible that the lens-side mount ring 012 of the interchangeable lens 010 be coupled to the body-side mount ring 022 of the packing-incompatible camera body 020B as shown in FIG. 9 because the body-side mount ring 022 of the packing-incompatible camera body 020B is identical in shape and size to the body-side mount ring 022 of the packing-compatible camera body 020A. Upon the interchangeable lens 010 being mounted to the packing-incompatible camera body 020B, the rear end of the annular packing 015 comes into elastic contact with the front surface (packing contacting surface) of the outward flange portion 024 of the body-side mount ring 022 while being resiliently deformed.

In addition, Japanese Unexamined Patent Publication H11-174562 is also related art with respect to the present invention.

A ring-shaped biasing member R1' including a pair of resilient projections R1a' is fixed to a rear end surface of the body-side mount ring 022 of the packing-compatible camera body 020A. On the other hand, a ring-shaped biasing member R2' (including a pair of resilient projections R2a') which is identical in shape and size to the ring-shaped biasing member R1' is fixed to a rear end surface of the body-side mount ring 022 of the packing-incompatible camera body 020B. Upon the lens-side mount ring 012 of the interchangeable lens 010 being coupled to the body-side mount ring 022 of either of the two camera bodies 020A and 020B, the pair of corresponding resilient projections R1a' or R2a' presses the lens-side mount ring 012 rearward to remove play between the lens-side mount ring 012 and the body-side mount ring 022 in the optical axis direction (horizontal direction with respect to FIGS. 8 and 9).

The biasing force of the pair of resilient projections R1a' of the ring-shaped biasing member R1' of the packing-compatible camera body 020A is predetermined in consideration of the elastic force which is exerted on the body-side mount ring 022 of the packing-compatible camera body 020A by the annular packing 015 (i.e., the biasing force of the annular packing 015 for biasing the interchangeable lens 010 forward with respect to the body-side mount ring 022). Therefore, upon the interchangeable lens 010 being mounted to the packing-compatible camera body 020A, the position of the interchangeable lens 010 relative to the packing-compatible camera body 020A in the optical axis direction is finely adjusted by a resultant of the following two forces: the forward biasing force of the annular packing 015 and the rearward biasing force of the pair of resilient projections R1a' so that the interchangeable lens 010 is held at an appropriate position relative to the packing-compatible camera body 020A in the optical axis direction.

On the other hand, since the packing-incompatible camera body 020B is designed without consideration of the annular packing 015 coming in elastic contact with a front surface of the outward flange portion 024 of the body-side mount ring 022, the biasing force of the pair of resilient projections R2a' of the ring-shaped biasing member R2' is predetermined without consideration of the elastic force which is exerted on the body-side mount ring 022 of the packing-compatible camera body 020B by the annular packing 015 (i.e., the biasing force of the annular packing 015 for biasing the interchangeable lens 010 forward with respect to the body-side mount ring 022).

Therefore, if the annular packing 015 comes in elastic contact with the body-side mount ring 022 when the interchangeable lens 010 is mounted to the packing-incompatible camera body 020B as shown in FIG. 9, not only the biasing force of the pair of resilient projections R2a' of the ring-shaped biasing member R2' but also the biasing force of the annular packing 015 are exerted on the body-side mount ring 022 and the lens-side mount ring 012, which causes the position of the interchangeable lens 010 relative to the packing-incompatible camera body 020B in the optical axis direction to deviate from an intended proper position. Consequently, the optical performance of the interchangeable lens 010 deteriorates.

Therefore, in the case where the user buys the new interchangeable lens 010 that is provided with the annular packing 015, although the new interchangeable lens 010 can be mounted to the packing-compatible camera body 020A and achieve a lens optical performance in accordance with the lens design thereof, if the new interchangeable lens 010 is mounted to the packing-incompatible camera body 020B, which may be already owned by the user, a lens optical performance cannot be achieved in accordance with the lens design thereof.

SUMMARY OF THE INVENTION

The present invention provides an interchangeable lens which is selectively mountable to a packing-compatible camera body and a packing-incompatible camera body, wherein the relative position between the interchangeable lens and the camera body to which the interchangeable lens is mounted in the optical axis direction is appropriate in either case where the interchangeable lens is mounted to the packing-compatible camera body or the packing-incompatible camera body. The present invention further provides a camera system including such interchangeable lenses.

According to an aspect of the present invention, an interchangeable lens is provided, selectively mountable to a first-type camera body and a second-type camera body, wherein the first-type camera body includes a first mount ring to which the interchangeable lens is mountable, wherein the second-type camera body includes a second mount ring to which the interchangeable lens is mountable, an outer diameter of the second mount ring being smaller than an outer diameter of the first mount ring. The interchangeable lens includes an annular packing made of a resilient material. An inner peripheral surface of a rear end of the annular packing is positioned radially outside of the second mount ring in a state where the interchangeable lens is mounted to the second-type camera body. The inner peripheral surface of the rear end of the annular packing is positioned radially inside an outer peripheral surface of the first mount ring in a state where the interchangeable lens is mounted to the first-type camera body.

It is desirable for the first mount ring to include an annular tapered surface formed on a front end surface of the first mount ring at an outer edge thereof so that the rear end of the annular packing resiliently presses against the annular tapered surface at a radially outer portion of the annular tapered surface when the interchangeable lens is mounted to the first-type camera body.

It is desirable for the interchangeable lens to include a stationary barrel and a lens-side mount ring fixed to the stationary barrel at a rear end thereof. The lens-side mount ring is coupled to the first mount ring when the interchangeable lens is mounted to the first-type camera body, and the lens-side mount ring is coupled to the second mount ring when the interchangeable lens is mounted to the second-type camera body. The annular packing is fixedly fitted over outer peripheral surfaces of the stationary barrel and an annular flange portion of the lens-side mount ring.

In an embodiment, an interchangeable lens is provided, selectively mountable to a first-type camera body and a second-type camera body. The first-type camera body includes a first mount ring to which the interchangeable lens is mountable. The second-type camera body includes a second mount ring to which the interchangeable lens is mountable. The interchangeable lens includes an annular packing made of a resilient material. The first mount ring includes an annular portion identical in size and shape to a corresponding annular portion of the second mount ring, and an annular contacting portion provided on an outer periphery of the annular portion. An inner peripheral surface of a rear end of the annular packing is positioned radially outside of the second mount ring in a state where the interchangeable lens is mounted to the second-type camera body. The inner peripheral surface of the rear end of the annular packing is positioned radially inside of an outer peripheral surface of the annular contacting portion in a state where the interchangeable lens is mounted to the first-type camera body.

It is desirable for the first mount ring to include an annular tapered surface formed on a front end surface of the first mount ring at an outer edge thereof so that the rear end of the annular packing resiliently presses against the annular tapered surface at a radially outer portion of the annular tapered surface when the interchangeable lens is mounted to the first-type camera body.

It is desirable for the interchangeable lens to include a stationary barrel and a lens-side mount ring fixed to the stationary barrel at a rear end thereof, wherein the lens-side mount ring is coupled to the first mount ring when the interchangeable lens is mounted to the first-type camera body, and the lens-side mount ring is coupled to the second mount ring when the interchangeable lens is mounted to the second-type camera body, and the annular packing is fixedly fitted over outer peripheral surfaces of the stationary barrel and an annular flange portion of the lens-side mount ring.

In an embodiment, a camera system is provided, including an interchangeable lens including a lens-side mount ring and an annular packing made of a resilient material; a first-type camera body including a first mount ring to which the lens-side mount ring is mountable, an outer diameter of a front end of the first mount ring being greater than an inner diameter of a rear end of the annular packing in a free state; and a second-type camera body including a second mount ring to which the lens-side mount ring is mountable, an outer diameter of a front end of the second mount ring being smaller than the inner diameter of the rear end of the annular packing in the free state, and an inner diameter of the second mount ring being equal to an inner diameter of the first mount ring. An inner peripheral surface of the rear end of the annular packing is positioned radially outside the second mount ring in a state where the lens-side mount ring is coupled to the second mount ring.

It is desirable for the first mount ring to include an annular tapered surface formed on a front end surface of the first mount ring at an outer edge thereof so that the rear end of the annular packing resiliently presses against the annular tapered surface at a radially outer portion of the annular tapered surface when the interchangeable lens is mounted to the first-type camera body.

In an embodiment, a camera system is provided, including an interchangeable lens including a lens-side mount ring and an annular packing made of a resilient material; a packing-incompatible camera body including a second mount ring to which the lens-side mount ring can be coupled, an inner peripheral surface of a rear end of the annular packing being positioned radially outside of the second mount ring in a state where the lens-side mount ring is coupled to the second mount ring; a packing-compatible camera body including a first mount ring to which the lens-side mount ring can be coupled. The first mount ring includes an annular portion identical in size and shape to a corresponding the second mount ring, and an annular contacting portion provided on an outer periphery of the annular portion of the first mount ring, an outer diameter of the first mount ring being greater than an inner diameter of a rear end of the annular packing in a free state.

According to the present invention, the relative position between the interchangeable lens and the camera body to which the interchangeable lens is mounted in the optical axis direction becomes appropriate in either case where the interchangeable lens is mounted to the first-type camera body (packing-compatible camera body) or the second-type camera body (packing-incompatible camera body). Therefore, in the case where the user buys the new interchangeable lens with the annular packing, a lens optical performance in accordance with the lens design thereof can be achieved even if this interchangeable lens is utilized with the packing incompatible camera body already owned by the user.

The present disclosure relates to subject matter contained in Japanese Patent Application No. 2006-259410 (filed on Sep. 25, 2006) which is expressly incorporated herein by reference in its entirety.

BRIEF DESCRIPTION OF THE DRAWINGS

The present invention will be described below in detail with reference to the accompanying drawings in which:

FIG. 1 is a front elevational view of a combination of a packing-compatible camera body and an embodiment of a packing-incorporated interchangeable lens, showing a state where the packing-incorporated interchangeable lens is mounted to the packing-compatible camera body;

FIG. 2 is a cross sectional view a portion of the combination of the packing-compatible camera body and the packing-incorporated interchangeable lens shown in FIG. 1, taken along II-II line shown in FIG. 1;

FIG. 5 is a front elevational view of a combination of a packing-incompatible camera body and the embodiment of the packing-incorporated interchangeable lens shown in FIGS. 1 and 2, showing a state where the interchangeable lens is mounted to the packing-incompatible camera body;

DESCRIPTION OF THE PREFERRED EMBODIMENTS

Figure 3:
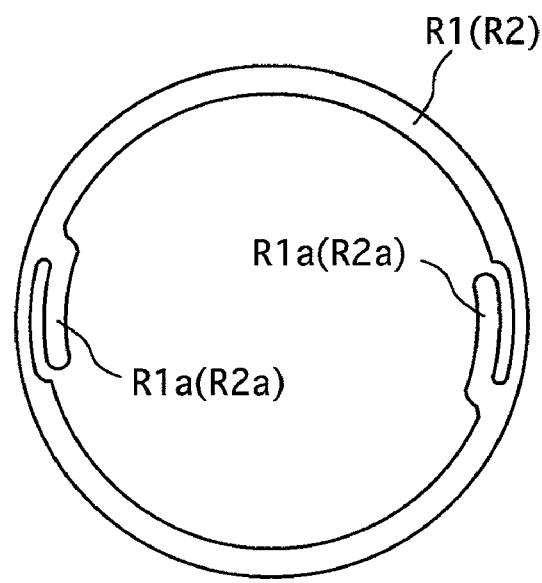
FIG. 3 is a front elevational view of a ring-shaped biasing member shown in FIGS. 2, 6 and 7 that is provided in each of the packing-compatible camera body and the packing-incompatible camera body as an element thereof.

The present invention will be hereinafter discussed with reference to FIGS. 1 through 6.

Firstly, the overall structure of a packing-incorporated interchangeable lens 10 will be discussed hereinafter.

The packing-incorporated interchangeable lens 10 is provided with a stationary barrel 11 formed as a cylindrical member centered on an optical axis O, and is provided at the rear end of the packing-incorporated interchangeable lens 10 with a lens-side mount ring 12 made of metal which is fixed to the rear end surface of the stationary barrel 11. The lens-side mount ring 12 is coaxially arranged with the stationary barrel 11, and is formed so as to have a decreasing diameter in three steps in the rearward direction (rightward as viewed in FIG. 2). The lens-side mount ring 12 is provided at the frontmost end thereof with an annular flange portion 13, the outer diameter of which is equal to the outer diameter of the stationary barrel 11. The lens-side mount ring 12 is provided, on an outer peripheral surface thereof at the rear end of this outer peripheral surface, with a set of three outward prongs (bayonets) 14 which project radially outwards at equi-angular intervals (intervals of 120 degrees) in the circumferential direction of the lens-side mount ring 12. In FIG. 2, only one of the three outward prongs 14 is shown. The packing-incorporated interchangeable lens 10 is provided with a cylinder-shaped annular packing 15 which is fixedly fitted over the outer peripheral surfaces of the stationary barrel 11 and the annular flange portion 13. The cylinder-shaped annular packing 15 is made of a resilient material such as rubber. The rear end of the annular packing 15 in a free state projects rearward from the rear end surface of the annular flange portion 13 of the lens-side mount ring 12 in the optical axis direction (direction of the optical axis O) (see FIG. 6).

A packing-compatible camera body (first-type camera body) 20A that is shown in FIGS. 1 through 4 is designed so that the joint between the packing-compatible camera body 20A and the packing-incorporated interchangeable lens 10 is sealed and packed with the annular packing 15 upon the packing-incorporated interchangeable lens 10 being mounted to the packing-compatible camera body 20A.

A central hole 21 is formed through the front wall of the packing-compatible camera body 20A, and the packing-compatible camera body 20A is provided with a body-side mount ring (first mount ring) 22 made of metal which is fitted into the central hole 21 of the front wall of the packing-compatible camera body 20A and fixed thereto. The body-side mount ring 22 is provided with a cylindrical portion 23 (the inner diameter of which is designated by "L2" in FIG. 2) and an annular flange portion 24. The cylindrical portion 23 is fitted into the central hole 21. The annular flange portion 24 projects radially outwards from the front end of the cylindrical portion 23. The front end of the body-side mount ring 22 is formed as the annular flange portion 24. As shown in FIG. 2, the outer diameter L1 of the annular flange portion 24 is greater than the inner diameter of the annular packing 15 in a free state. Note that the annular flange portion 24 includes an annular contacting portion 32 which corresponds to a portion of the annular flange portion 24 which is positioned radially outside from imaginary lines (two-dot chain lines) A (see FIG. 2) corresponding to the position of the outer edge of an annular flange portion 31 shown in FIG. 6, so that an annular portion of the body-side mount ring 22 radially inwards from the imaginary lines A is the equivalent to a body-side mount ring 30 of the packing-incompatible camera body 20B, the body-side mount ring 30 being provided with an annular portion including the cylindrical portion 23 and the annular flange portion 31. The front surface of the annular flange portion 24 lies in a plane orthogonal to the optical axis O. The front surface of the annular contacting portion 32 is formed to serve as a packing contacting surface 25. The body-side mount ring 22 is provided, on an inner peripheral surface thereof at the rear end of this inner peripheral surface, with a set of three inward prongs (bayonets) 26 which project radially inwards at equi-angular intervals (intervals of 120 degrees) in the circumferential direction of the body-side mount ring 22. In FIG. 2, only one of the three inward prongs 26 is shown. The body-side mount ring 22 is provided among the set of three inward prongs 26 with a set of three arc-shaped cutout portions 27 which are formed so that the set of three inward prongs 26 and the set of three arc-shaped cutout portions 27 are alternately positioned in the circumferential direction of the body-side mount ring 22. Each arch-shaped cutout portion 27 is in the shape of an arc as viewed from the front of the body-side mount ring 22.

Figure 4:
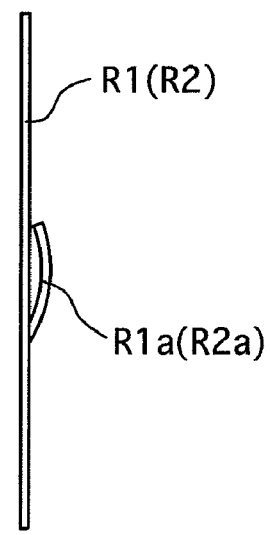
FIG. 4 is a side elevational view of the ring-shaped biasing member shown in FIG. 3.

A ring-shaped biasing member R1 is fixed to a rear end surface of the body-side mount ring 22 of the packing-compatible camera body 20A. The ring-shaped biasing member R1 biases the lens-side mount ring 12 in the rearward direction with respect to the body-side mount ring 22 to press the lens-side mount ring 12 against the body-side mount ring 22 upon the lens-side mount ring 12 of the packing-incorporated interchangeable lens 10 being coupled to the body-side mount ring 22. For instance, the ring-shaped biasing member R1 (and also a ring-shaped biasing member R2 provided on a packing-incompatible camera body (second-type camera body) 20B shown in FIGS. 5 and 6) can be molded from metal. The ring-shaped biasing member R1 is provided with a pair of resilient projections R1a which are arranged at intervals of 180 degrees in the circumferential direction of the ring-shaped biasing member R1 as shown in FIGS. 3 and 4. The pair of resilient projections R1a project rearward from the flat and ring-shaped body of the ring-shaped biasing member R1 and are resiliently deformable.

Figure 6:
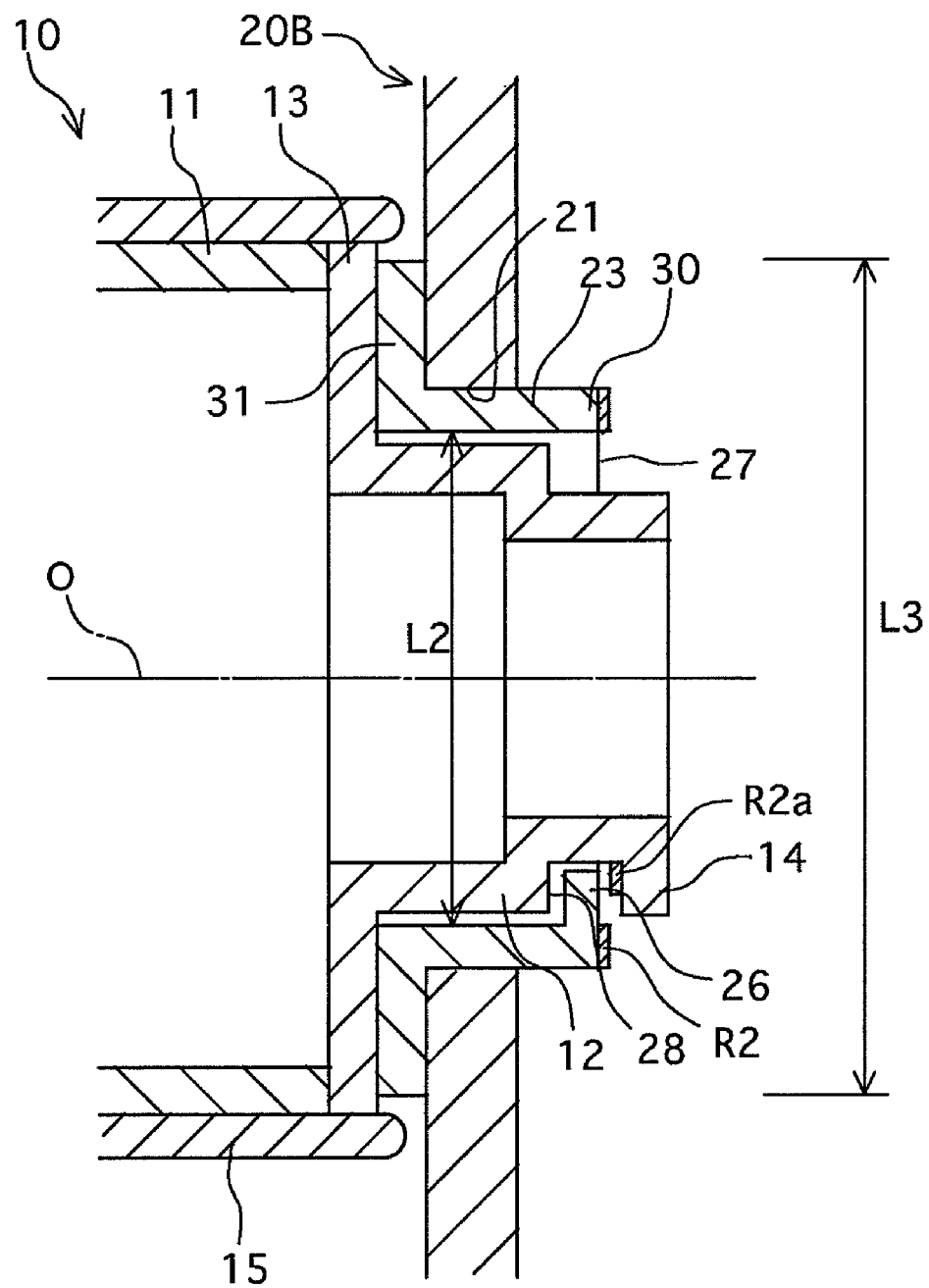
FIG. 6 is a cross sectional view of a portion of the combination of the packing-incompatible camera body and the packing-incorporated interchangeable lens shown in FIG. 5, taken along VI-VI line shown in FIG. 5.

The packing-incompatible camera body 20B that is shown in FIGS. 5 and 6 is designed so that the joint between the packing-incompatible camera body 20B and the packing-incorporated interchangeable lens 10 is not sealed or packed with the annular packing 15 upon the packing-incorporated interchangeable lens 10 being mounted to the packing-incompatible camera body 20B.

The packing-incompatible camera body 20B is identical in basic structure to the packing-compatible camera body 20A; however, the body-side mount ring 30 (which corresponds to the body-side mount ring 22) and the ring-shaped biasing member R2 of the packing-incompatible camera body 20B (which is fixed to a rear end surface of the body-side mount ring 30) are different in structure from the body-side mount ring 22 and the ring-shaped biasing member R1 of the packing-compatible camera body 20A, respectively.

Specifically, the body-side mount ring (second mount ring) 30 of the packing-incompatible camera body 20B is provided with a cylindrical portion 23, a set of three inward prongs 26 and a set of three arc-shaped cutout portions 27 which are identical in shape and size to the cylindrical portion 23, the set of three inward prongs 26 and the set of three arc-shaped cutout portions 27 of the body-side mount ring 22 of the packing-compatible camera body 20A, respectively. The inner diameter, i.e., "L2" of the cylindrical portion 23 of the body-side mount ring 30 of the packing-incompatible camera body 20B is equal to that of the packing-compatible camera body 20A; however, the outer diameter L3 of the annular flange portion 31, which corresponds to the annular flange portion 24 of the body-side mount ring 22 of the packing-compatible camera body 20A, is smaller than the outer diameter L1 of the annular flange portion 24 of the body-side mount ring 22 of the packing-compatible camera body 20A and the inner diameter of the rear end of the annular packing 15 in a free state. The front surface of the annular flange portion 31 is a flat surface orthogonal to the optical axis O.

Additionally, the ring-shaped biasing member R2 is identical in shape and size of the ring-shaped biasing member R1; however, the ring-shaped biasing member R2 is designed so that the biasing force (spring force) of the pair of resilient projections R2a is smaller than that of the pair of resilient projections R1a of the ring-shaped biasing member R1.

The packing-incorporated interchangeable lens 10, the packing-compatible camera body 20A and the packing-incompatible camera body 20B are elements of the present embodiment of the camera system.

The procedure for mounting the packing-incorporated interchangeable lens 10 to each of the packing-compatible camera body 20A and the packing-incompatible camera body 20B and effects obtained through the use of the present embodiment of the camera system will be discussed hereinafter.

Firstly, the procedure for mounting the packing-incorporated interchangeable lens 10 to the packing-compatible camera body 20A will be discussed hereinafter.

First of all, the packing-incorporated interchangeable lens 10 which is disengaged from the packing-compatible camera body 20A is brought close to the body-side mount ring 22 from front of the packing-compatible camera body 20A, and the rear end of the lens-side mount ring 12 is inserted into the inside of the body-side mount ring 22. In this inserting operation, the set of three outward prongs 14 of the lens-side mount ring 12 are moved rearward up to a position behind the set of three inward prongs 26 in the optical axis direction through the set of three arc-shaped cutout portions 27 with the set of three outward prongs 14 of the lens-side mount ring 12 being aligned with the set of three arc-shaped cutout portions 27 of the body-side mount ring 22, respectively, as viewed in the optical axis direction. Thereafter, the packing-incorporated interchangeable lens 10 is manually rotated circumferentially (about the optical axis O) relative to the packing-compatible camera body 20A until the set of three outward prongs 14 are positioned immediately behind the set of three inward prongs 26, respectively. Thereupon, the mounting of the packing-incorporated interchangeable lens 10 to the packing-compatible camera body 20A (the coupling of the lens-side mount ring 12 to the body-side mount ring 22) is completed.

After this completion of the mounting of the packing-incorporated interchangeable lens 10 to the packing-compatible camera body 20A, a clearance is created between the set of three inward prongs 26 of the body-side mount ring 22 and the set of three outward prongs 14 of the lens-side mount ring 12 in the optical axis direction, while a clearance is created between the set of three inward prongs 26 of the body-side mount ring 22 and an annular stepped portion 28 of the lens-side mount ring 12 in the optical axis direction as shown in FIG. 2. The annular stepped portion 28 is formed on the lens-side mount ring 12 in front of the set of three outward prongs 14 with a predetermined gap between the annular stepped portion 28 and the set of three outward prongs 14 in the optical axis direction. Additionally, upon the completion of the mounting of the packing-incorporated interchangeable lens 10 to the packing-compatible camera body 20A, the rear end of the annular packing 15 comes in elastic contact with the packing contacting surface 25 of the annular contacting portion 32 of the body-side mount ring 22 while being resiliently deformed (squeezed) (i.e., while the annular packing 15 being compressed to seal the joint between the annular packing 15 and the body-side mount ring 22 in a watertight fashion), thus causing the packing-incorporated interchangeable lens 10 to be biased forward relative to the packing-compatible camera body 20A by the resiliency of the rear end of the annular packing 15. On the other hand, the pair of resilient projections R1a of the ring-shaped biasing member R1 biases the front surfaces of the set of three outward prongs 14 of the packing-incorporated interchangeable lens 10 rearward relative to the packing-compatible camera body 20A. Since the biasing force of the pair of resilient projections R1a is greater than the biasing force of the annular packing 15, a part of the biasing force of the pair of resilient projections R1a cancels out the biasing force of the annular packing 15 while the remaining part of the biasing force of the pair of resilient projections R1a moves the packing-incorporated interchangeable lens 10 rearward slightly relative to the packing-compatible camera body 20A within the range of the above described two clearances so that the packing-incorporated interchangeable lens 10 is held at an appropriate position relative to the packing-compatible camera body 20A in the optical axis direction. Consequently, the packing-incorporated interchangeable lens 10 can make full use of the capabilities thereof as per specifications when the packing-incorporated interchangeable lens 10 is mounted to the packing-compatible camera body 20A to be used therewith.

On the other hand, the packing-incorporated interchangeable lens 10 can be mounted to the packing-incompatible camera body 20B in a procedure similar to the above described procedure for mounting the packing-incorporated interchangeable lens 10 to the packing-compatible camera body 20A.

Upon the completion of the mounting of the packing-incorporated interchangeable lens 10 to the packing-incompatible camera body 20B, a clearance is created between the set of three inward prongs 26 of the body-side mount ring 22 and the set of three outward prongs 14 of the lens-side mount ring 12 in the optical axis direction while a clearance is created between the set of three inward prongs 26 of the body-side mount ring 30 and an annular stepped portion 28 of the lens-side mount ring 12 in the optical axis direction as shown in FIG. 6. In this state, no biasing force is exerted on the annular flange portion 31 by the rear end of the annular packing 15 because the rear end of the annular packing 15 is not in contact with (not compressed by) the annular flange portion 31. On the other hand, since the pair of resilient projections R2a of the ring-shaped biasing member R2 biases the front surfaces of the set of three outward prongs 14 of the packing-incorporated interchangeable lens 10 rearward relative to the packing-incompatible camera body 20B, the packing-incorporated interchangeable lens 10 moves slightly rearward relative to the packing-incompatible camera body 20B only by the biasing force of the pair of resilient projections R2a so that the packing-incorporated interchangeable lens 10 is held at an appropriate position relative to the packing-incompatible camera body 20B in the optical axis direction. Consequently, the packing-incorporated interchangeable lens 10 can make full use of the capabilities thereof as per specifications even when the packing-incorporated interchangeable lens 10 is mounted to the packing-incompatible camera body 20B to be used therewith.

Since the packing-incorporated interchangeable lens 10 can make full use of the capabilities thereof as per specifications, not only when the packing-incorporated interchangeable lens 10 is mounted to the packing-compatible camera body 20A to be used therewith but also when the packing-incorporated interchangeable lens 10 is mounted to the packing-incompatible camera body 20B to be used therewith as described above, a user whose possesses only the packing-incorporated interchangeable lens 10 and the packing-compatible camera body 20A does not have to purchase a new interchangeable lens (with no packing) designed specifically for the packing-incompatible camera body 20B when the user newly purchases the packing-incompatible camera body 20B.

The present invention is not limited solely to the above-described particular embodiment. Various modifications of the above-described embodiment are possible.

Figure 7:
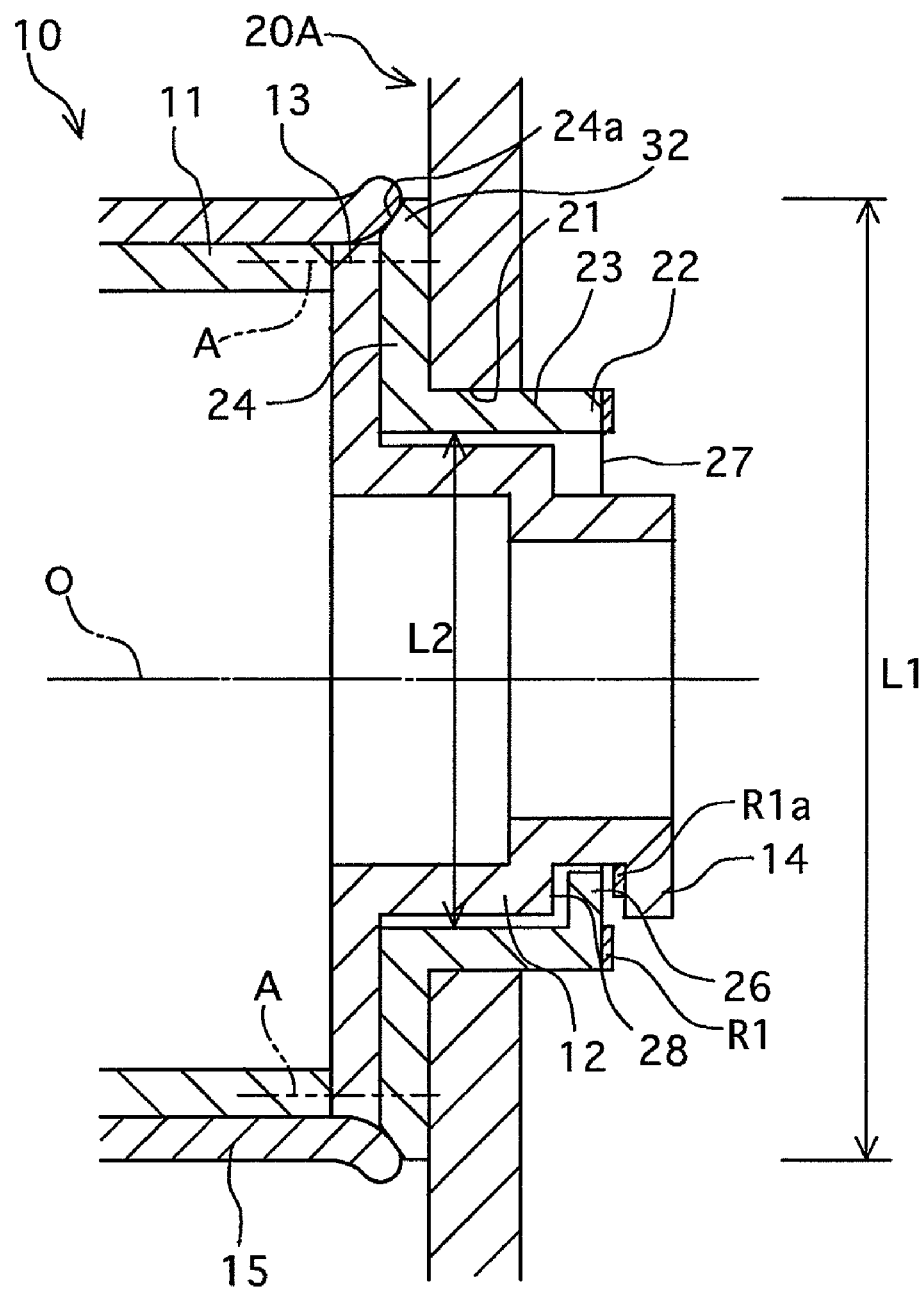
FIG. 7 is a view similar to that of FIG. 2, showing a modification of the body-side mount ring shown in FIG. 2.
Figure 8:
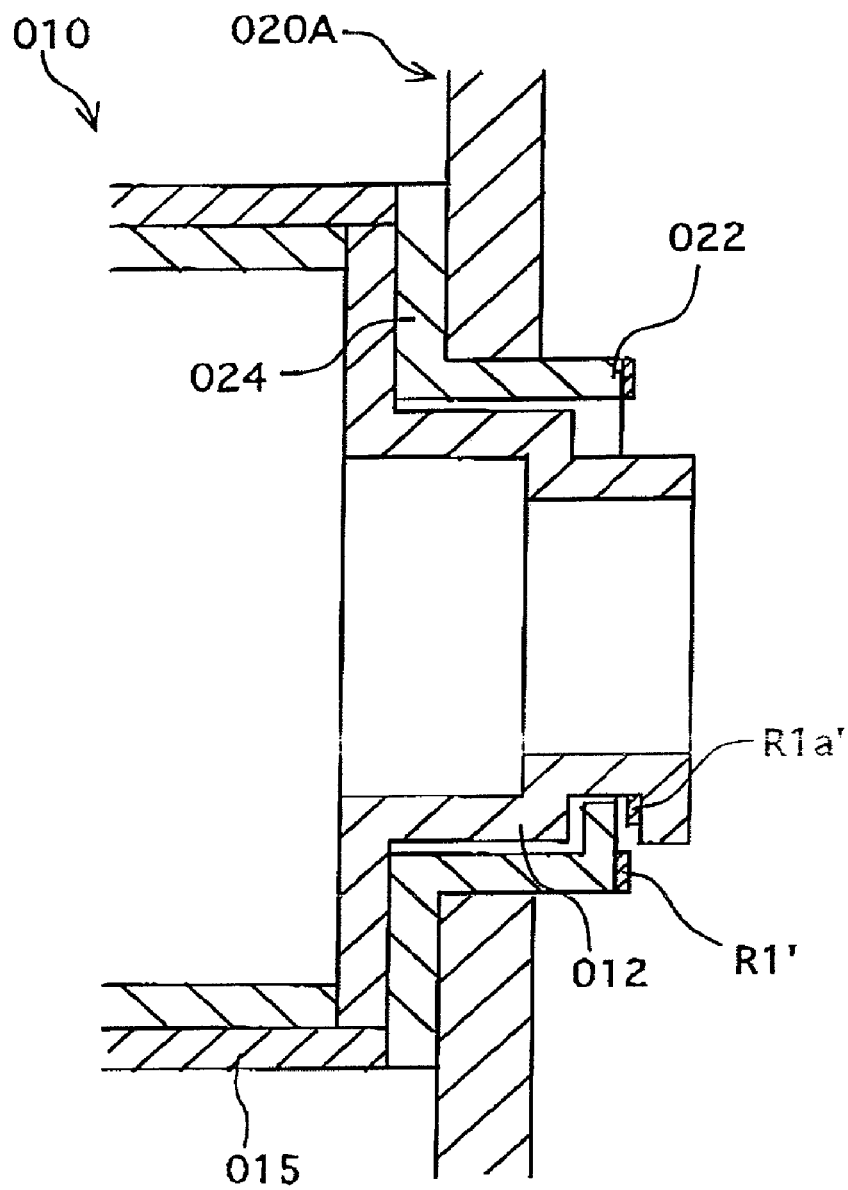
FIG. 8 is a view similar to that of FIG. 2, showing a state where a conventional interchangeable lens with an annular packing is mounted to a packing-compatible camera body.
Figure 9:
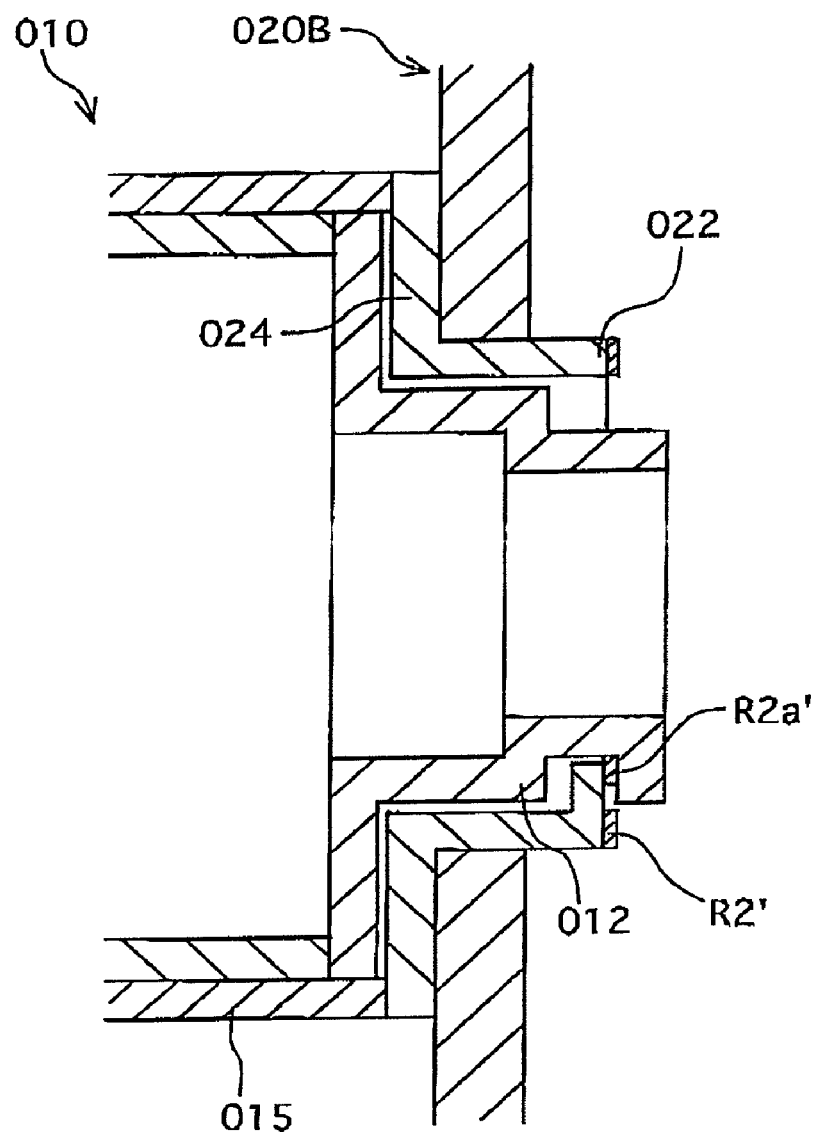
FIG. 9 is a view similar to that of FIG. 2, showing a state where a conventional interchangeable lens with an annular packing is mounted to a packing-incompatible camera body.

For instance, it is possible for a front surface of the annular contacting portion 32 of the annular flange portion 24 in the vicinity of the outer edge thereof, with which the rear end of the annular packing 15 comes in contact when the packing-incorporated interchangeable lens 10 is mounted to the packing-compatible camera body 20A, to be formed as an annular tapered surface 24a which tapers toward the front of the packing-compatible camera body 20A in radially inward directions toward the optical axis O as shown in FIG. 7, so that the rear end of the annular packing 15 comes in elastic contact with the annular tapered surface 24a while being resiliently deformed (squeezed) when the packing-incorporated interchangeable lens 10 is mounted to the packing-compatible camera body 20A. With this structure, the joint between the annular packing 15 and the body-side mount ring 22 can be packed (water-sealed) more effectively since the rear end of the annular packing 15 resiliently presses against the annular tapered surface 24a from the outer periphery of the annular tapered surface 24a.

Additionally, although the annular flange portion 31 is formed so that the outer diameter L3 thereof becomes smaller than the inner diameter of the rear end of the annular packing 15 in each of the above described embodiment shown in FIGS. 5 and 6 and the modification shown in FIG. 7, the annular flange portion 31 can be formed so that the outer diameter L3 thereof is equal to the inner diameter of the rear end of the annular packing 15.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera system comprising:
    an interchangeable lens including a lens-side mount ring and an annular packing made of a resilient material;
    a first-type camera body including a first mount ring to which said lens-side mount ring is mountable, an outer diameter of a front end of said first mount ring being greater than an inner diameter of a rear end of said annular packing in a free state; and
    a second-type camera body including a second mount ring to which said lens-side mount ring is mountable, an outer diameter of a front end of said second mount ring being smaller than said inner diameter of said rear end of said annular packing in said free state, and an inner diameter of said second mount ring being equal to an inner diameter of said first mount ring,
    wherein an inner peripheral surface of said rear end of said annular packing is positioned radially outside said second mount ring in a state where said lens-side mount ring is coupled to said second mount ring, and
    wherein said annular packing does not contact said second mount ring when said lens-side mount ring is mounted on said second-type camera body.

2. The camera system according to claim 1, wherein said first mount ring comprises an annular tapered surface formed on a front end surface of said first mount ring at an outer edge thereof so that said rear end of said annular packing resiliently presses against said annular tapered surface at a radially outer portion of said annular tapered surface when said interchangeable lens is mounted to said first-type camera body.

3. The interchangeable lens according to claim 1, further comprising a stationary barrel and the lens-side mount ring fixed to said stationary barrel at a rear end thereof, wherein said annular packing is fixedly fitted over outer peripheral surfaces of said stationary barrel and an annular flange portion of said lens-side mount ring.

4. A camera system comprising:

an interchangeable lens including a lens-side mount ring and an annular packing made of a resilient material;

a packing-incompatible camera body including a second mount ring to which said lens-side mount ring can be coupled, an inner peripheral surface of a rear end of said annular packing being positioned radially outside of said second mount ring in a state where said lens-side mount ring is coupled to said second mount ring;

a packing-compatible camera body including a first mount ring to which said lens-side mount ring can be coupled, wherein said first mount ring includes an annular portion identical in size and shape to a corresponding said second mount ring; and an annular contacting portion provided on an outer periphery of said annular portion of said first mount ring, an outer diameter of said first mount ring being greater than an inner diameter of a rear end of said annular packing in a free state, and wherein said annular packing does not contact said second mount ring when said lens-side mount ring is mounted on said second-type camera body.

5. The interchangeable lens according to claim 4, further comprising a stationary barrel and the lens-side mount ring fixed to said stationary barrel at a rear end thereof wherein said annular packing is fixedly fitted over outer peripheral surfaces of said stationary barrel and an annular flange portion of said lens-side mount ring.

6. The camera system according to claim 4, wherein said first mount ring comprises an annular tapered surface formed on a front end surface of said first mount ring at an outer edge thereof so that said rear end of said annular packing resiliently presses against said annular tapered surface at a radially outer portion of said annular tapered surface when said interchangeable lens is mounted to said first-type camera body.

\* \* \* \* \*